United States Patent
Takemoto et al.

(10) Patent No.: US 7,801,309 B2
(45) Date of Patent: Sep. 21, 2010

(54) PRIVATE KEY DELIVERY SYSTEM AND A PRIVATE KEY DELIVERY METHOD

(75) Inventors: Kazuya Takemoto, Kawasaki (JP); Tatsuya Usuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1298 days.

(21) Appl. No.: 11/209,677

(22) Filed: Aug. 24, 2005

(65) Prior Publication Data

US 2006/0210083 A1 Sep. 21, 2006

(30) Foreign Application Priority Data

Feb. 17, 2005 (JP) ............................. 2005-040977

(51) Int. Cl.
*H04L 9/08* (2006.01)
*H04L 9/00* (2006.01)
*G06E 3/00* (2006.01)

(52) U.S. Cl. .................... 380/278; 380/259; 359/107

(58) Field of Classification Search ................. 380/278, 380/259; 359/107
See application file for complete search history.

(56) References Cited

U.S. PATENT DOCUMENTS

| | | | | |
|---|---|---|---|---|
| 5,757,912 | A * | 5/1998 | Blow | 380/256 |
| 5,768,378 | A * | 6/1998 | Townsend et al. | 380/256 |
| 6,438,234 | B1 * | 8/2002 | Gisin et al. | 380/256 |
| 6,522,749 | B2 * | 2/2003 | Wang | 380/263 |
| 6,529,601 | B1 * | 3/2003 | Townsend | 380/256 |
| 7,113,598 | B2 * | 9/2006 | Flusberg et al. | 380/256 |
| 7,227,955 | B2 * | 6/2007 | Trifonov et al. | 380/256 |
| 7,346,166 | B2 * | 3/2008 | Inoue et al. | 380/263 |
| 7,460,669 | B2 * | 12/2008 | Foden et al. | 380/256 |
| 7,606,371 | B2 * | 10/2009 | Zavriyev et al. | 380/283 |
| 2003/0002674 | A1 * | 1/2003 | Nambu et al. | 380/256 |
| 2004/0190725 | A1 * | 9/2004 | Yuan et al. | 380/283 |

(Continued)

FOREIGN PATENT DOCUMENTS

JP 2000-216775 8/2000

(Continued)

OTHER PUBLICATIONS

C. Becher et.. al. ,A quantum dot single-photon source,, Physica Elsevier Science B.V E 13 (2002) pp. 412-417.*

(Continued)

*Primary Examiner*—Techane J Gergiso
(74) *Attorney, Agent, or Firm*—Fujitsu Patent Center

(57) ABSTRACT

A private key delivery system and a private key delivery method are disclosed. The private key delivery system includes a transmitter, a receiver, and an optical transmission line connecting the transmitter and the receiver. The transmitter includes a single photon generating unit for simultaneously generating two or more single photons having different wavelengths using a quantum dot structure that has quantum dots of various sizes, an optical splitter for splitting the single photons by wavelengths, a phase modulating unit for modulating each of the single photons split by the wavelengths with private key information, and an optical multiplexer for multiplexing the modulated single photons of the different wavelength and for transmitting the multiplexed single photons to the optical transmission line. The multiplexed single photons are received by the receiver, and the private key information is taken out from the received single photons.

11 Claims, 11 Drawing Sheets

U.S. PATENT DOCUMENTS

| | | |
|---|---|---|
| 2005/0047601 A1* | 3/2005 | Shields et al. .............. 380/283 |
| 2005/0078827 A1* | 4/2005 | Tajima ....................... 380/256 |
| 2005/0190921 A1* | 9/2005 | Schlafer et al. ............. 380/278 |
| 2005/0190922 A1* | 9/2005 | LaGasse ..................... 380/278 |
| 2006/0018475 A1* | 1/2006 | Vig et al. .................... 380/256 |

FOREIGN PATENT DOCUMENTS

| | | |
|---|---|---|
| JP | 2003-249928 | 9/2003 |
| JP | 2004-187268 A | 7/2004 |

OTHER PUBLICATIONS

"Japanese Office Action,",in corresponding JP Pat. App. No. 2005-040977, mailed Aug. 18, 2009, Partial English Translation.

Inoue, Kyo "Quantum Cryptography Using a Single-Photon or Coherent Source," *Proceeding of the 2004 IEICE Electronics Society Conference 1*, Sep. 2004, S17-S18, Partial English Translation.

Shields, Andrew "Single Photon Technology for Secure Optical Quantum Communications,"*Toshiba Review* No. 1,vol. 57 2002, p. 25-28, Partial English Translation.

* cited by examiner

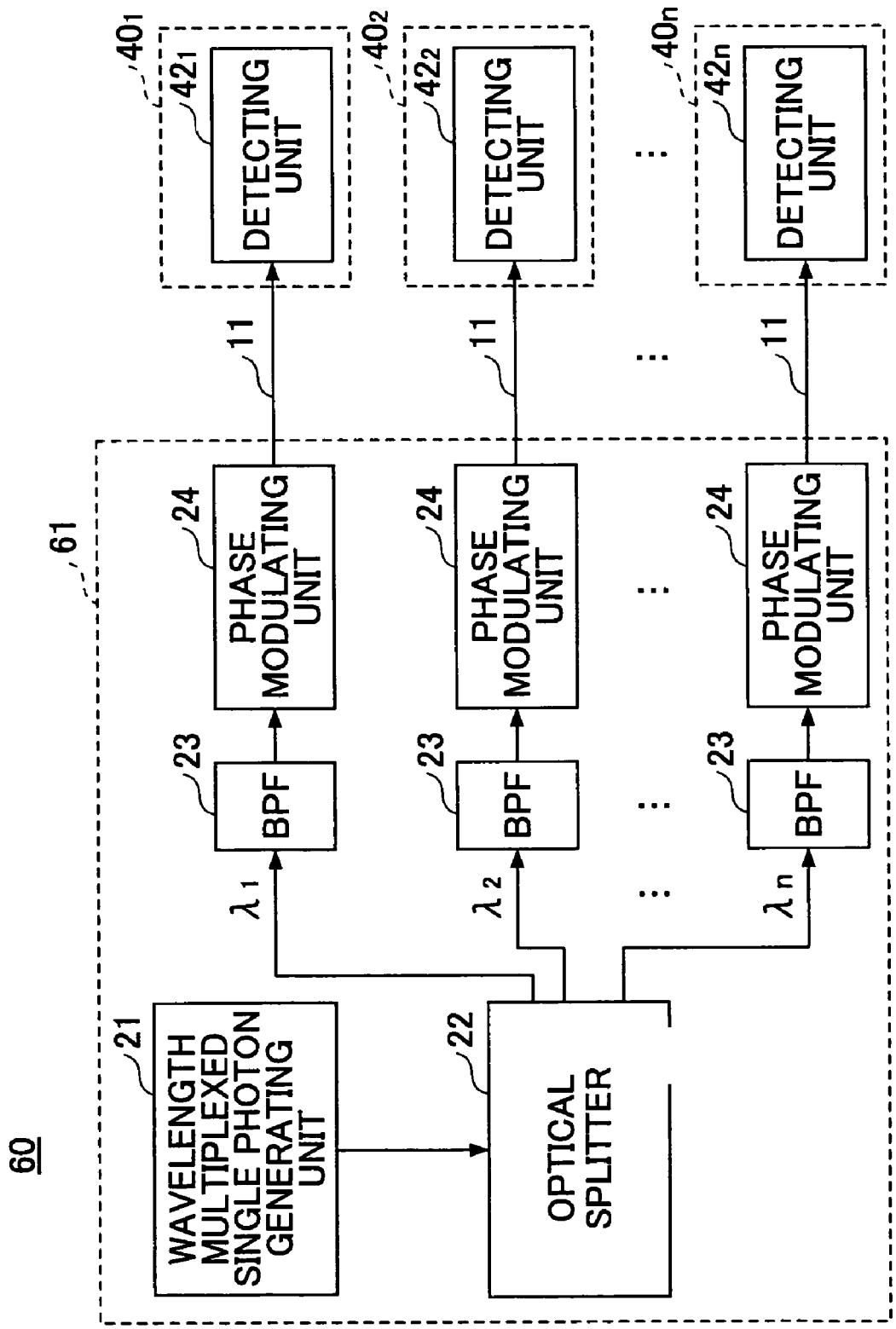

PRIVATE KEY DELIVERY SYSTEM AND A PRIVATE KEY DELIVERY METHOD

BACKGROUND OF THE INVENTION

1. Field of the Invention

The present invention relates to a private key delivery system and a private key delivery method.

2. Description of the Related Art

Safe and secure cryptocommunications are indispensable for realization of a next-generation information society where such as electronic government and electronic commerce are conceived. In crypto-communications, a public key method and a private key method are used. One practice of the public key method includes an RSA public key method that is widely used at present, information security of which is based only on the principle that a long time is required to acquire factorization of a very large number into prime factors by a polynomial, that is, it takes a long time to decode, there being a huge amount of computation required. Therefore, if a quantum-improvement computer capable of performing high-speed parallel computing becomes available, the time required of decoding a long code such as RSA code will be shortened by leaps and bounds. Then, if a public key in the public key method can be decoded by high-speed computing, there could be tapping of data and fear of alteration by a third party, degrading information security to a level far from perfect. Further, according to the private key method, a sender and a receiver share the same private key, the sender enciphers data by the private key, and the receiver decodes the enciphered data with the private key. Further, in the private key method, there is a possibility of the private key being intercepted by a third party when the private key is distributed to the sender and the receiver. That is, information security is not perfect.

As means to solve the problem relating to information security as described above, use of quantum coding is considered to be promising. As for quantum coding, various methods are proposed, e.g., BB84 (proposed by C. H. Bennett and G. Brassard in 1984), and E91 (proposed by A. K. Ekert in 1991). In the case of BB84, for example, information is carried and transmitted by each photon instead of an aggregate of photons like conventional optical communication. For example, if one bit of information is represented by one of polarization states of a photon, the bit cannot be copied or taken out from the photon without destroying the state of the photon. This is because the behavior of the photon follows Heisenberg's uncertainty principle (the principle that physical quantities of a conjugate cannot be correctly measured simultaneously), and the no-cloning theorem (the theorem that reproduction of a quantum state cannot be copied without observing the quantum state). Therefore, although tapping a communication path by a third party cannot be prevented in the quantum coding method, tapping (copying and alteration) can be detected. In this way, where an information bearer is a single photon, the information security of the private key shared by the sender and the receiver is guaranteed based on a physical principle, not the computational complexity/difficulty.

In recent years and continuing, quantum code systems are being put into practical use. A quantum code system includes a transmitting side that includes a single photon generating unit for generating a photon (single photon), and a polarization state control unit for assigning information of a private key to a photon; and a receiving side that includes a single photon detecting unit for detecting the information on the photon. As the single photon generating unit, a laser light source and an attenuator are usually used, wherein a laser pulse train is irradiated from a laser light source, luminous intensity of which is attenuated by the attenuator such that the average number of photons per pulse becomes 1 or less. That is, the single photon generating unit generates a pseudo-single photon.

[Patent reference 1] JPA 2003-249928
[Patent reference 2] JPA 2000-216775

DESCRIPTION OF THE INVENTION

Problem(a) to be Solved by the Invention

However, according to the conventional single photon generating unit, only a pseudo-single photon is generated, i.e., two or more photons may be contained in a pulse. Where a pulse contains two or more photons, the photons carry the same information. Accordingly, even if one of the photons is tapped, the receiving side cannot always detect the tapping act, and the problem is that information security is not perfect.

Accordingly, it is conceived that the average number of photons per pulse be further decreased so that the probability of two or more photons being present per pulse is reduced. In this case, although information security is improved, the number of pulses without a photon increases, and there is a problem in that the transfer rate falls remarkably.

SUMMARY OF THE INVENTION

The present invention is made in view of the problems described above. An objective of the present invention is offering a private key delivery system and a private key delivery method that provide high information security at a high transfer rate, substantially obviating one or more of the problems caused by the limitations and disadvantages of the related art.

Further, another objective of the present invention is to provide a private key delivery system and a private key delivery method of one transmitter simultaneously supplying two or more receivers with private key information, or a medium for generating the private key information.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a private key delivery system and a private key delivery method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

Means for Solving the Problem

An aspect of the present invention provides a private key delivery system that includes a transmitter that includes a single photon generating unit for generating single photons, and encoding units for encoding the single photons with private key information, a receiver that includes a detecting unit for detecting the private key information from the single photons, and an optical transmission line for connecting the transmitter and the receiver; wherein the single photon generating unit of the transmitter includes a quantum dot structure for simultaneously generating two or more single photons that have different wavelengths, the transmitter further includes optical splitters that split the single photons according to wavelengths, the optical splitters being placed between the single photon generating unit and the corresponding encoding units, and the encoding units are provided corresponding to the wavelengths of the single photons.

According to the private key delivery system described above, the transmitter has the quantum dot structure for simultaneously generating two or more single photons having different wavelengths, each of the single photons is modulated by the private key information, and the single photons are transmitted to the receiver. In this way, the private key information is transmitted at a high transfer rate. Further, since the quantum dot structure generates single photons having different wavelengths, the private key delivery system provides extremely high to perfect information security. Here, in this specification and the claims, a "single photon" means an optical pulse containing only one photon.

Another aspect of the present invention provides a private key delivery system wherein two receivers share private key information, the private key delivery system including a transmitter that includes a single photon pair generating unit for generating single photon pairs in an entangled state, and optical couplers for separating each of the single photon pairs into individual single photons, two receivers for receiving either one of the single photons that have been separated, and for generating the private key information, and an optical transmission line for connecting the transmitter and the receivers, wherein the single photon pair generating unit of the transmitter includes a quantum dot structure for simultaneously generating two or more single photon pairs having different wavelengths in the entangled state.

According to the present invention, the transmitter simultaneously generates single photon pairs having different wavelengths in the entangled state from the quantum dot structure of the single photon pair generating unit, separates each single photon pair into individual single photons resulting in two groups of single photons having different wavelengths, transmits one of the groups of the separated single photons to one receiver, and transmits the other group of the separated single photons to the other receiver. Since each group of the separated single photons includes two or more single photons of different wavelengths, two or more single photons are simultaneously transmitted to each of the receivers. Each receiver generates the private key information based on the single photons that are received. That is, the single photons having different wavelengths serve as the wavelength multiplexing of the single photons in the entangled state. In this way, a medium serving as the base for generating the private key information is transmitted at a high transfer rate. Further, since the quantum dot structure generates the single photons and the pairs of the single photons in the entangled state, a private key delivery system that has high or perfect information security is realizable. Here, the "entangled state" is a state wherein the quantum state (the state that is described by the quantum theory) of two or more particles has correlation in a specific combination.

Effect of the Invention

As described above, the present invention offers a private key delivery system and a private key delivery method that offer high information security and a high transfer rate. Further, the present invention offers a private key delivery system and a private key delivery method wherein one transmitter simultaneously supplies two or more receivers with the private key information, or the medium for generating the private key information.

BRIEF DESCRIPTION OF THE DRAWINGS

FIG. 8 is a block diagram showing the structure of a private key delivery system according to the second embodiment of the present invention;

DESCRIPTION OF THE PREFERRED EMBODIMENTS

In the following, embodiments of the present invention are described with reference to the accompanying drawings.

First Embodiment

A private key delivery system 10 according to the first embodiment of the present invention is a system that delivers private key information from a transmitter 20 to a receiver 40 using a quantum code.

Figure 1:
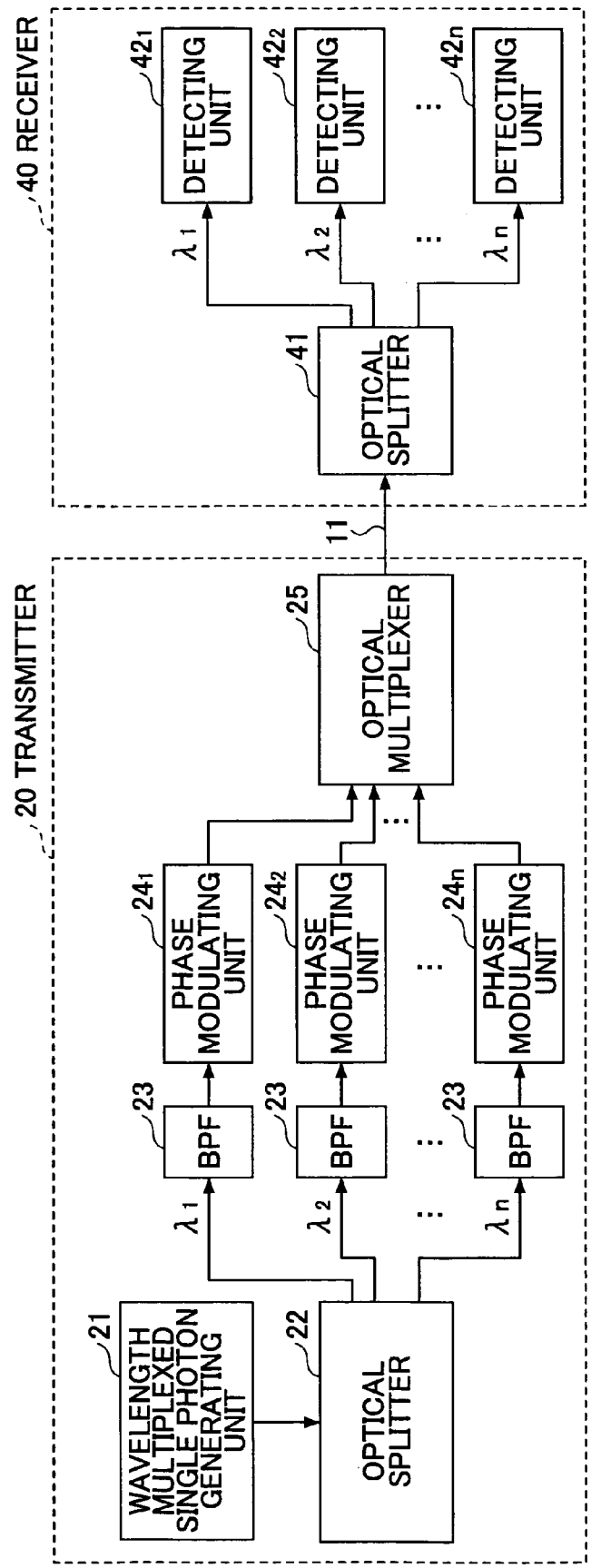
FIG. 1 is a block diagram showing the structure of a private key delivery system according to the first embodiment of the present invention.

FIG. 1 is a block diagram showing the structure of the private key delivery system 10 according to the first embodiment of the present invention.

With reference to FIG. 1, the private key delivery system 10 includes the transmitter 20, the receiver 40, and an optical transmission line 11, wherein the transmitter 20 transmits the private key information carried by single photons that are wavelength multiplexed to the receiver 40 through the optical transmission line 11, and the receiver 40 takes out the private key information from the wavelength multiplexed single photons received from the optical transmission line 11.

The private key delivery system 10 delivers the private key information using a quantum code for sharing the private key information between two parties. Here, the case where the private key information is transmitted from the transmitter 20 to the receiver 40 is described.

First, the transmitter 20 of the private key delivery system 10 is described in detail.

The transmitter 20 includes a wavelength multiplexed single photon generating unit 21 for generating two or more single photons having different wavelengths λ1 through λn, an optical splitter 22 for splitting the single photons by wavelengths, bandpass filters 23 for intercepting excessive photons other than the wavelengths between λ1 and λn, phase modulating units 24 for modulating the single photons by the private key information, and an optical multiplexer 25 for multiplexing the modulated single photons of the wavelengths λ1 through λn, and for sending out the multiplexed single photons to the optical transmission line 11.

The wavelength multiplexed single photon generating unit 21 generates the single photons that are wavelength multiplexed, i.e., the single photons have mutually different wavelengths. A single photon is an optical pulse containing only one photon.

Figure 2:
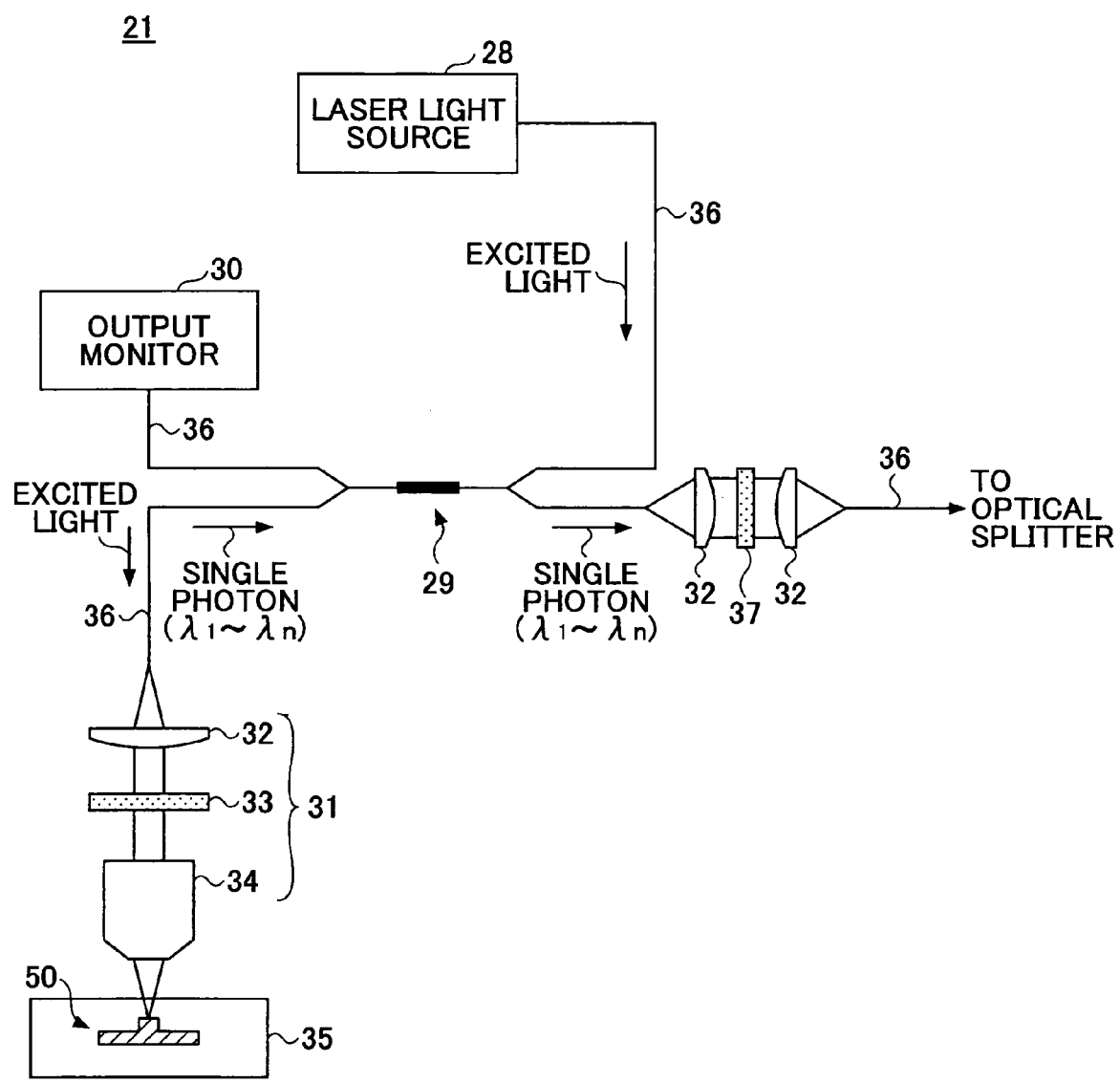
FIG. 2 is a schematic diagram showing the structure of a wavelength multiplexed single photon generating unit according to the first embodiment.

FIG. 2 shows the structure of the wavelength multiplexed single photon generating unit 21 according to the first embodiment. With reference to FIG. 2, the wavelength multiplexed single photon generating unit 21 includes a laser light source 28, an optical coupler 29, an output monitor 30, a condensing optical system 31, a quantum dot structure 50, a refrigerator 35, and a lowpass filter 37, which are connected by optical fibers 36.

The laser light source 28 is a pulsing laser that irradiates an excitation light consisting of a pulse train, for example, a Ti:sapphire laser that irradiates at a wavelength 780 nm. The width of the pulse irradiated by the laser light source 28 is set smaller than the luminescence lifetime of a quantum dot, which is described below. The luminescence lifetime of a typical single dot is 1 ns (Phys. Rev. B Vol. 64 (2001. pp. 201302-1-201302-4). By setting up the pulse width in accordance with this, a single photon having a desired wavelength can be generated. It is desirable to set the pulse width no greater than 100 ps, for example, 80 fs ($80 \times 10^{-15}$ seconds).

Further, the repetition frequency of the pulse train of the laser light source 28 may be suitably selected, and it is set, for example, at 80 MHz. Here, the highest repetition frequency available is about 1 GHz from the viewpoint of the luminescence lifetime of the quantum dot. Further, the laser light source 28 is not restricted to what is described above, but other laser light sources can be used as long as the excitation light that includes the pulse train described above can be irradiated.

In addition, although illustration is omitted, a pulse picker may be provided between the laser light source 28 and the optical coupler 29 for matching the repetition frequency of the excitation light with the speed of detecting units $42_1$, through $42_n$ of the receiver 40 shown by FIG. 1.

An output power of the pulse of the excitation laser light source 28 is set up such that irradiation of one pulse to the quantum dot structure (details following) generates one photon for each of predetermined wavelengths. That is, if the output power of the pulse is too high, two or more photons having the very close wavelength within a spectrum band of the bandpass filter are generated, and it is no longer a single photon. Further, if the output power of the pulse is too low, a photon will not be generated. In this connection, the output power of the pulse is monitored by the output monitor 30.

The condensing optical system 31 includes a condenser lens 32, a silicon filter 33, and an objective lens 34, which are arranged in this sequence from the optical coupler 29 side. The condensing optical system 31 condenses the pulse train as the excitation light provided through the optical coupler 29 to the quantum dot structure 50. Further, the condensing optical system 31 condenses and sends out the single photons having the wavelengths λ1 through λn that are sent out to the optical fibers 36 from the quantum dot structure 50. At this juncture, the silicon filter 33 removes a scattered excitation light.

The quantum dot structure 50 is arranged in the refrigerator 35, for example, a cryostat, and cooled at about –263° C. (10° K) by liquid helium. The excitation light is irradiated to the quantum dot structure 50 through an optical window provided to the cryostat.

Figure 3:
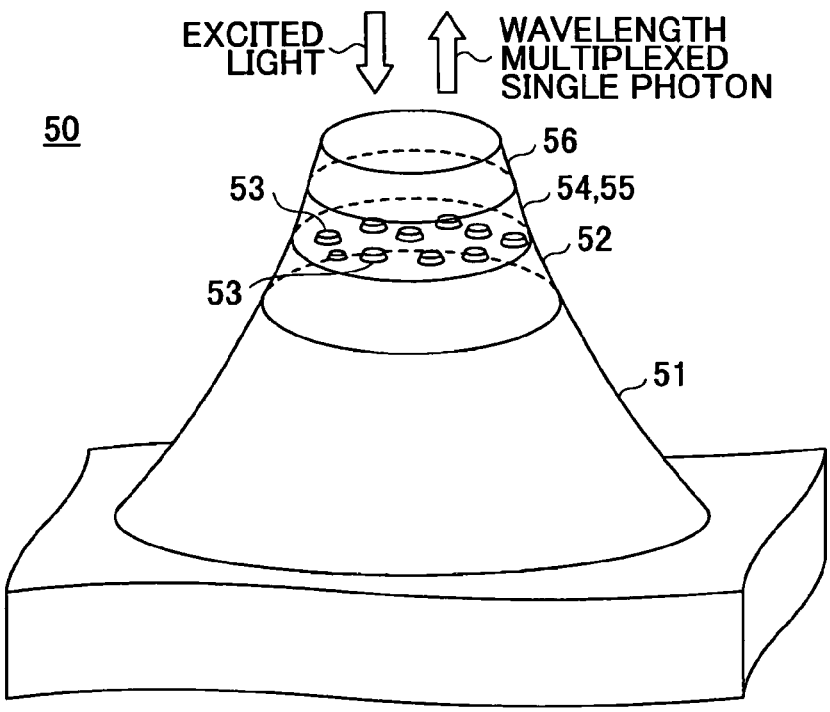
FIG. 3 is a perspective diagram of a quantum dot structure.
Figure 4:
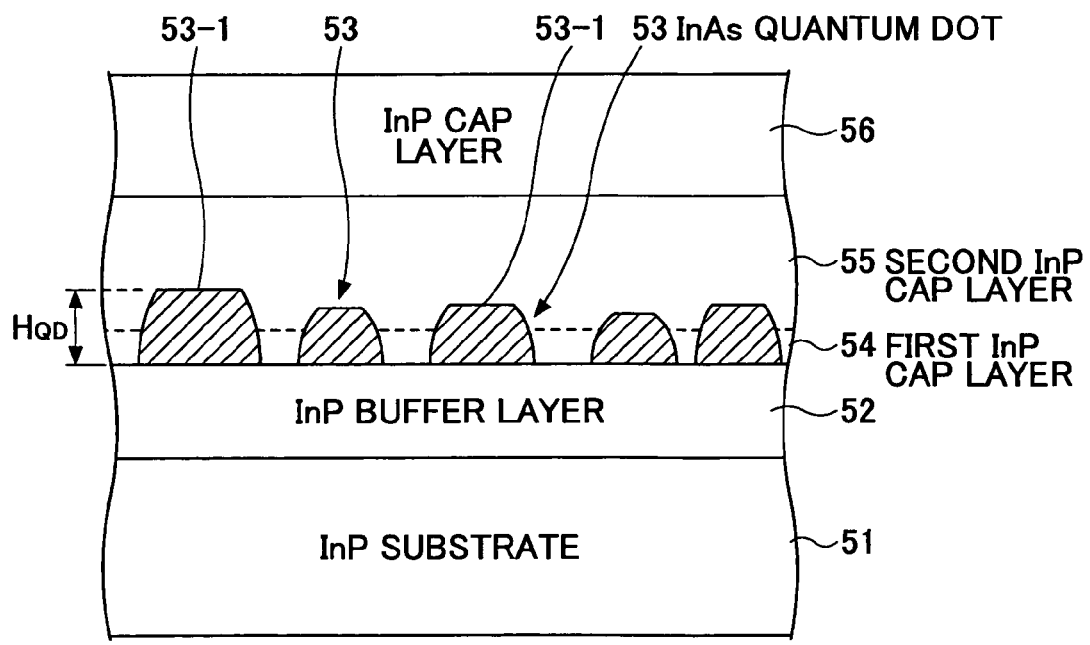
FIG. 4 is a cross-sectional diagram of the principal part of the quantum dot structure.

FIG. 3 is a perspective diagram of the quantum dot structure, and FIG. 4 is a cross-sectional diagram of the principal part of the quantum dot structure 50.

With reference to FIG. 3 and FIG. 4, the cross-sectional shape of the quantum dot structure 50 is like a mountain as shown by FIG. 3, and it has a mesa structure with a flat summit. FIG. 4 is an expanded cross-sectional diagram near the summit of the quantum dot structure 50. In addition, the summit shown by FIG. 3 corresponds to the surface of an InP cap layer 56 shown by FIG. 4. Here, the quantum dot structure 50 may have the shape of a plateau where the area of the summit is large with low height instead of the mountain shape.

The quantum dot structure 50 has InAs/InP quantum dots. Specifically, the quantum dot structure 50 is formed on an InP substrate 51, and includes an InP buffer layer 52 (200 nm thick) formed on the InP substrate 51, two or more InAs quantum dots 53 formed on the surface of the InP buffer layer 52, a first InP double cap layer 54 (2 nm thick) that covers the surface of the InP buffer layer 52 and the InAs quantum dots 53, a second InP double cap layer 55 (18 nm thick), and an InP cap layer 56 (100 nm thick) on the second InP double cap layer 55.

The InAs quantum dots 53 have different diameters from dot to dot, and are formed on the surface of the InP buffer layer 52. The InAs quantum dots 53 emit single photons by irradiation of a suitable excitation light from the side of the InP cap layer 56. The single photons run to the incidence side of the excitation light. The wavelengths of the single photons are mainly determined by the heights of the InAs quantum dots 53. For example, the higher is the height of quantum dots, the longer is the wavelength of a single photon. Further, the InAs quantum dots 53 have a disk-like form wherein the upper surfaces 53-1 are formed almost flat. Each of the InAs quantum dots 53 is epitaxially grown in the height direction. Using the double-cap method described later, the heights $H_{QD}$ of the InAs quantum dots 53 become in discrete values. Therefore, the wavelengths of the single photons irradiated by the InAs quantum dots 53 become discrete, and it becomes easy for the transmitter to split the single photons according to wavelength.

According to studies by the inventor hereto, et al., it has been learned that a discrete spectrum with a narrow wavelength width in communication wavelengths (wavelength between 1.3 through 1.55 μm) is available from the InAs quantum dots 53 of the quantum dot structure 50 having the structure described above (Jpn. J. Appl. Phys. Vol. 43 No. 3A (2004) pp. L349-L351). Further, it is known that single photons having the wavelengths of the spectrum as described above are obtained from a quantum dot structure (Jpn. J. Appl. Phys. Vol. 43 No. 7B (2004) pp. L993-L995).

Figure 5:
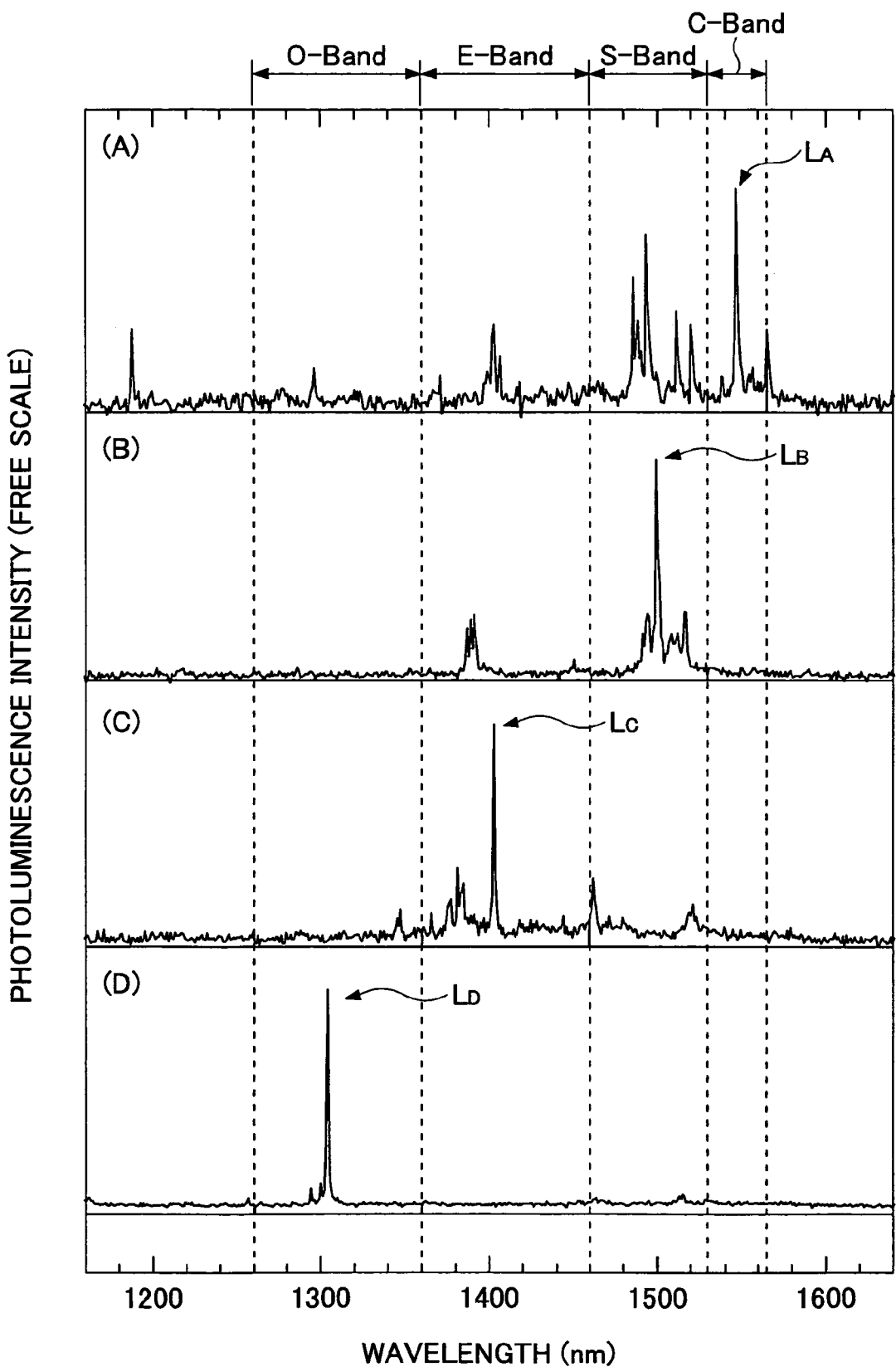
FIG. 5 gives graphs showing an example of a photoluminescence spectrum of the quantum dot structure at 10K.

FIG. 5 shows an example of the photoluminescence spectrum of the quantum dot structure at 10° K. FIG. 5 gives photoluminescence spectra of four quantum dot structures (A) through (D). The quantum dot structures (A) through (D) have almost the same composition as the quantum dot structure 50 of the first embodiment; however, each of the four quantum dot structures has almost one quantum dot.

With reference to FIG. 5, discrete and sharp (i.e., narrow wavelength width) bright lines $L_A$ through $L_D$ are obtained from the quantum dot structures (A) through (D), respectively. The wavelength width of the bright lines $L_A$ through $L_D$ is less than 1 nm. Although each of the bright lines $L_A$ through $L_D$ is generated with other bright lines (satellites), the satellites are well apart from each of the bright lines $L_A$ through $L_D$; and for this reason, the bright lines $L_A$ through $L_D$ can be easily separated. Further, since the intensity of the bright lines $L_A$ through $L_D$ is high, single photons can be easily obtained by adjusting the wavelength and intensity of the excitation light. Further, the single photons can be taken out, while other bright lines having lower intensity are eliminated.

The quantum dot structure 50 of the embodiment has two or more InAs quantum dots that show bright lines such as $L_A$ through $L_D$ on the InP buffer layer 52 of the mesa structure shown by FIG. 3. The number of the InAs quantum dots is, for example, between 10 and 20. By arranging the quantum dots as described above, desired single photons having mutually different wavelengths are obtained by irradiation of one pulse of the excitation light.

Here, the bright lines $L_A$ through $L_D$ belong to C band, S band, E band, and O band, respectively, of the communication band. The C band, S band, E band, and O band are bands where an optical fiber in single mode is used, and gigabit transmissions are carried out. Accordingly, the single photons can be carried from the transmitter to the receiver at a high transfer rate. A quantum dot structure may provide two or more bright lines in any one of the communication bands. In the following description, the quantum dot structure is described as being capable of irradiating a light that has n bright lines as shown by FIG. 5, where n is an integer greater than 1.

With reference to FIG. 2 again, the single photons that are wavelength multiplexed and output from the quantum dot structure 50 are condensed by the condensing optical system 31, are provided to the optical fibers 36, and reach the low pass filter 37 through the optical coupler 29.

The low pass filter 37 is not special, but is chosen according to the wavelength of the excitation light such that the excitation light is intercepted. The multiplexed single photons that pass through the low pass filter 37 are provided to the optical splitter 22 through the optical fiber 36.

With reference to FIG. 1 again, the optical splitter 22 splits the multiplexed single photons according to the corresponding wavelengths λ1 through λn. As the optical splitter 22, for example, a wavelength division multiplexing (WDM) coupler, and an AWG (Arrayed Waveguide Grating) wavelength add/drop can be used.

The band pass filter 23 intercepts photons that have wavelengths close to the desired wavelength, and passes only the single photons of the desired wavelength. The bandpass filter 23 intercepts the photons that are not intercepted by the optical splitter 22. The wavelength width of the pass band of the bandpass filter 23 can be set at less than 1 nm. As the bandpass filter 23, for example, a dielectric multilayer filter, a diffraction grating, and a prism can be used.

In addition, the structure of the bandpass filter 23 may be such that the width of the pass band is adjustable. Further, when photons that have wavelengths other than the desired wavelength are sufficiently removed by the optical splitter 22, the bandpass filter 23 can be dispensed with.

The phase modulating units 24 are provided corresponding to the wavelengths λ1 through λn of the single photons. The phase modulating units 24 are for encoding an element of the private key information by the phase state of each of the single photons. For example, each phase modulating unit 24 encodes data element "1" by modulating the phase by $\pi$, while data element "0" is represented by no phase modulation. Here, the phase of a photon is quantized, and can take four states (values), namely, 0, $\pi/2$, $\pi$, and $3\pi/2$.

Supposing that a rule is made such that the private key information is expressed by a matrix A of m lines and n columns, for example, components $A_{11}$ through $A_{1n}$ of the matrix A are assigned to the phase modulating units $24_1$, through $24_n$, respectively. Subsequently, components $A_{21}$ through $A_{2n}$ are assigned to the phase modulating units $24_1$ through $24_n$, respectively, for single photons that the phase modulating units are to receive next. This operation is repeated until components $A_{m1}$ through $A_{mn}$ are assigned to the phase modulating units $24_1$ through $24_n$, respectively. The private key information is carried by the single photons according to the rule described above. Since the elements of the private key information can be transmitted in parallel by assigning the private key information to the single photons that are wavelength multiplexed, a high transfer rate is obtained.

The optical multiplexer 25 multiplexes the single photons having different wavelengths, and sends the multiplexed single photons to the optical transmission line 11. A WDM coupler, and an AWG wavelength add/drop can be used as the optical multiplexer 25 as in the case of the optical splitter 22.

Next, the receiver 40 of the private key delivery system 10 is described.

The receiver 40 includes an optical splitter 41 for splitting the wavelength multiplexed single photons received from the optical transmission line 11 into the wavelengths λ1 through λn, and detecting units $42_1$ through $42_n$ for taking out the private key information from the corresponding single photons.

The optical splitter 41 is for splitting the multiplexed single photons according to wavelengths λ1 through λn. A WDM coupler and an AWG wavelength add/drop can be used as the optical splitter 41 as in the case of the optical splitter 22 of the transmitter 20.

The detecting units $42_1$ through $42_n$ are provided corresponding to the wavelengths λ1 through λn, respectively, and detect the phase state of the corresponding single photons received from the optical splitter 41. As the detecting units $42_1$ through $42_n$, a single photon detecting unit connected to a Mach-Zehnder interferometer can be used, for example.

The detecting units $42_1$ through $42_n$ detect the phase information of the corresponding single photons of the corresponding wavelengths a λ1 through λn, that is, data elements "0" and "1" are decoded such that the encoded private key information, specifically the matrix A, is obtained.

As described above, according to the private key delivery system 10 of the first embodiment, the transmitter 20 simultaneously generates two or more single photons having different wavelengths using the wavelength multiplexed single photon generating unit 21, modulates each single photon by an element of the private key information, multiplexes the modulated single photons again, and sends the multiplexed single photons out to the optical transmission line 11. Then, the receiver 40 detects the element of the private key information from each wavelength, and reconfigures the private key information. In this manner, since the single photons are wavelength multiplexed, the private key information can be transmitted at a high transfer rate.

Further, the wavelength multiplexed single photon generating unit 21 generates the multiplexed single photons for every shot of the excitation light. Therefore, the single photons are generated more efficiently than by the conventional source of a pseudo-single photon. The efficient generation of the single photons according to the private key delivery system 10 contributes to raising the transfer rate of the private key information.

Further, since the repetition frequency of irradiating the excitation light can be raised to about 1 GHz, the private key information can be transmitted at a higher transfer rate.

Further, the wavelength multiplexed single photon generating unit 21 has the quantum dot structure 50, rather than the conventional source of a pseudo-single photon, so that single photons can be correctly and efficiently generated, and information security is increased. Since the quantum dot structure 50 is formed with one chip, the refrigerator 35 for cooling the quantum dot structure 50 can be miniaturized, rather than arranging two or more quantum dot structures, each generating a single photon of a single wavelength. Accordingly, the cost of the refrigerator 35 can be lowered.

Here, the first embodiment has been described for an example shown by FIG. 1 where the phase modulation method is used as the coding technique of the private key information. Nevertheless, other method may be used, such as a polarization coding method. In the case where the polarization coding method is used, a polarization controller replaces the phase modulating units $24_1$ through $24_n$ of the transmitter 10 shown by FIG. 1. The polarization controller assigns vertical polarization (90° polarization) to data element "1", and horizontal polarization (0°) to data element "0", for example. In this case, a polarized photon measuring instrument and a single photon detecting unit are used in place of the detecting units $42_1$ through $42_n$ of the receiver 40. The polarized photon measuring instrument, for example, a 0°-90° polarimeter, detects the polarization such that the single photon of polarization 0° is detected to obtain the data element "0". In addition, the encoding and the decoding methods are not limited to the technique described above, but another well-known technique may be used.

Further, the first embodiment is described for the case where one optical transmission line 11 is used as shown by FIG. 1; however, the phase modulating units $24_1$ through $24_n$ of the transmitter 20 and the detecting units $40_1$ through $40_n$ of the receiver 40 may be directly connected in parallel by n optical transmission lines, in which case the optical multiplexer 25 of the transmitter 20 and the optical splitter 41 of the receiver 40 can be dispensed with.

Next, a manufacturing method of the quantum dot structure 50 according to the first embodiment is described with reference to FIG. 6 and FIG. 7. The quantum dot structure 50 is formed as follows using an metal organic chemical vapor deposition (MOCVD) method, and the so-called double cap method.

Figure 6A:
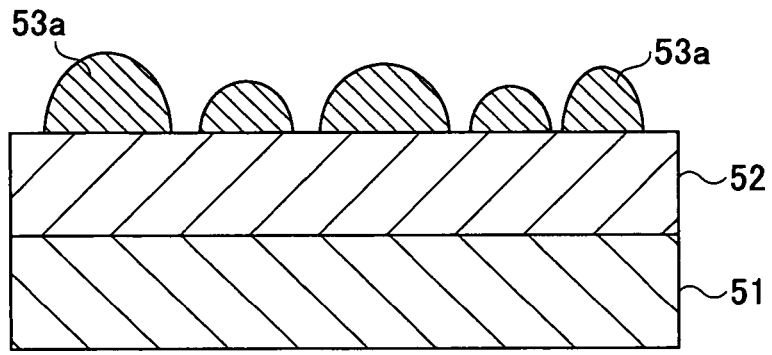
FIGS. 6A through 6C are cross-sectional diagrams showing a manufacturing process (part 1) of the quantum dot structure.

First, at a process shown by FIG. 6A, on the InP substrate 51, the principal plane of which is in the field (100) and doped with Fe, the MOCVD method with a reduced pressure is performed, and the InP buffer layer 52 is formed. Specifically, triethyl indium and phosphorus hydride are provided as a precursor, and hydrogen gas is supplied as carrier gas; then, the pressure is set at 6666.1 Pa (50 Torr), the temperature is set at 600° C., and the InP buffer layer 52 is grown up.

Further, at the process of FIG. 6A, on the InP buffer layer 52, the reduced pressure MOCVD method is used, and InAs quantum dot precursors 53a are formed by self-organization. Specifically, triethyl indium and arsenic hydride are provided as a precursor, and hydrogen gas is supplied as carrier gas; then, the pressure is set at 50 Torr, the temperature is set at 500° C., and the InAs quantum dot precursors 53a are grown up by, for example, depositing 2.8 monolayers of InAs. Subsequently, an annealing for 15 seconds is performed in an arsenic hydride atmosphere. Then, the InAs quantum dot precursors 53a are formed on the InP buffer layer 52 in the S-K (Stranski-Krastanow) type growth mode. The InAs quantum dot precursors 53a obtained as above vary in the diameters and heights. Under the conditions as described above, the diameters of the InAs quantum dot precursors 53a are distributed in a range between 35 nm and 70 nm, and the heights range between 3 nm and 12 nm. Further, the density of InAs quantum dot precursors 53a is $1.8 \times 10^{10}$ cm$^{-2}$. Here, the S-K type growth mode is a growth mode wherein a growth island is formed by self-organization on a ground layer in early stages of the hetero epitaxial growth of a lattice mismatching system.

Figure 6B:
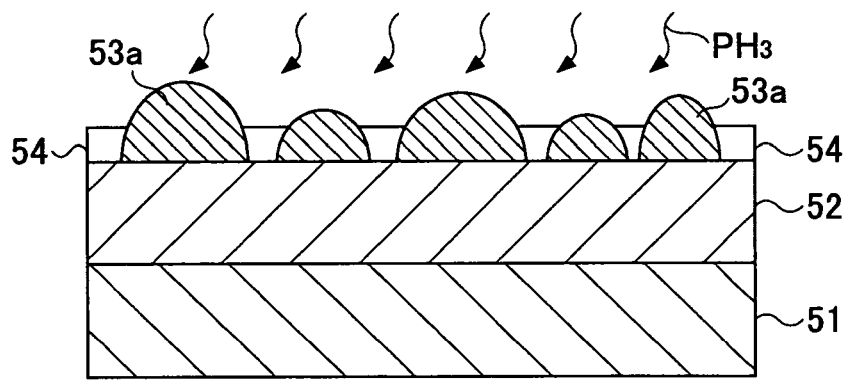

At a process shown by FIG. 6B, the first InP cap layer 54 is formed on the surface of the structure shown by FIG. 6A. Specifically, the temperature is set at 500° C., and like the formation conditions of the InP buffer layer 52 described above, the first InP cap layer 54 is formed at a 2 nm thickness so that the surface of the InAs quantum dot precursors 53a and the InP buffer layer 52 are covered. Since the thickness of the InAs quantum dot precursors 53a is greater than the first InP cap layer 54, the upper parts of the InAs quantum dot precursors 53a are exposed.

Figure 6C:
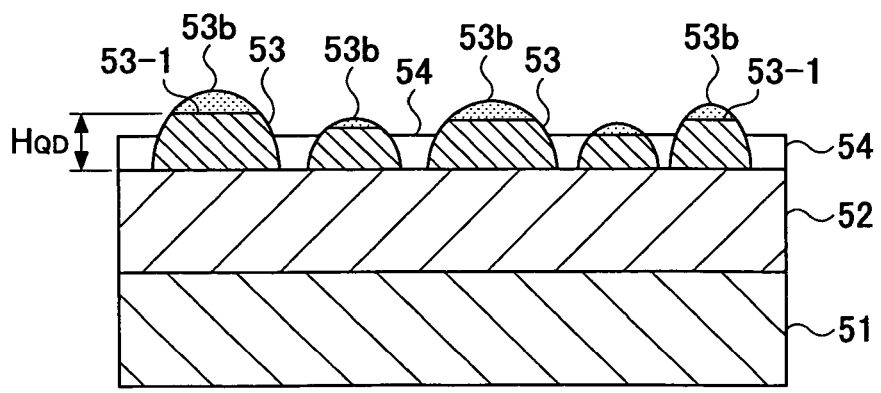

Further, at a process of FIG. 6B, the surfaces of the upper parts of InAs quantum dot precursors 53a are exposed to phosphorus hydride for 120 seconds. By this process, a reaction with the phosphorus hydride occurs near the upper surface of the InAs quantum dot precursors 53a, the upper surface being exposed from the first InP cap layer 54, and InAs is replaced by InP. In this manner, the InAs quantum dots 53, the upper surfaces of which are covered by InP 53b, are formed as shown in FIG. 6C. Consequently, the height $H_{QD}$ of the portion of each InAs quantum dot, which portion comprises the InAs, is lessened. The heights $H_{QD}$ are heights of integral multiples of InAs molecules. Therefore, the InAs quantum dots come to have discrete heights.

Subsequently, at a process shown by FIG. 7A, the second InP cap layer 55 of 18 nm thickness is formed on the surface of the InAs quantum dots 53, the surface having been replaced by InP, and the first InP cap layer 54 under the same the formation conditions as the first InP cap layer 54.

Figure 7A:
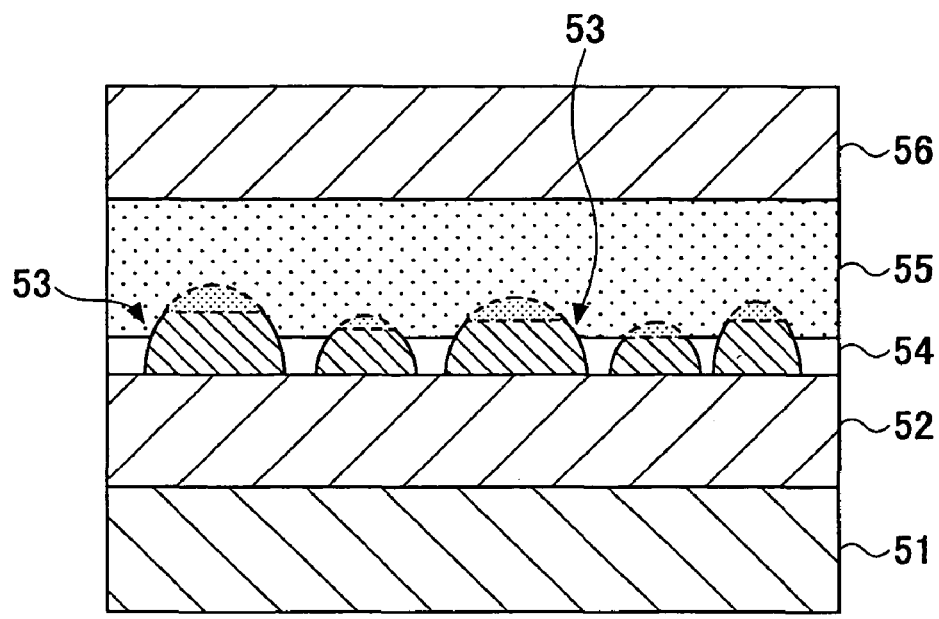
FIGS. 7A and 7B are cross-sectional diagrams showing the manufacturing process (part 2) of the quantum dot structure.

Further, at the process of FIG. 7A, the temperature is set at 600° C., and the InP cap layer 56 of 100 nm thickness is formed on the second InP double cap layer 55 under the same formation conditions of the InP buffer layer 52.

Figure 7B:
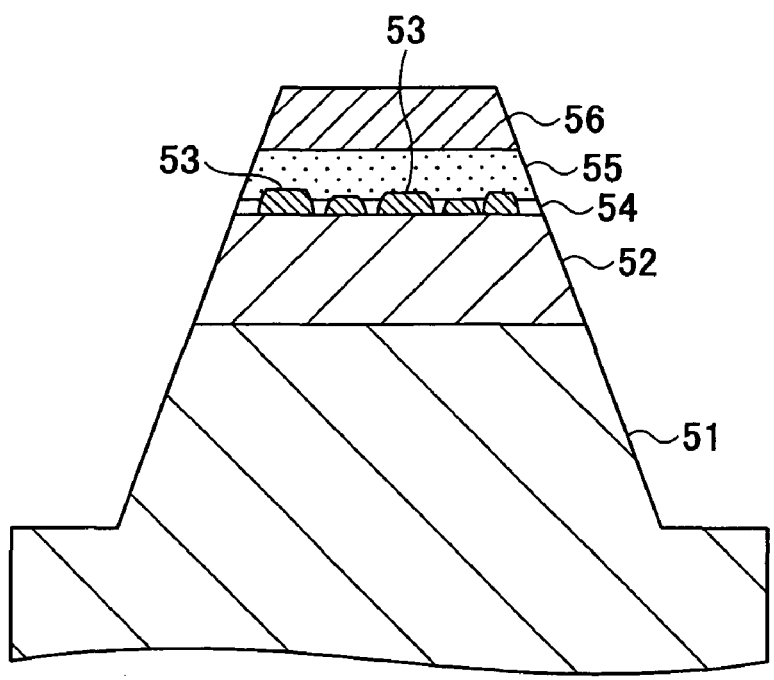

Subsequently, at the process shown by FIG. 7B, etching is performed on the structure shown by FIG. 7A that has been formed as described above, such that the structure is shaped like a mountain or a plateau as shown by FIG. 3. Specifically, patterning is carried out by a photolithography method, and etching is performed by a wet etching method. In this manner, the quantum dot structure that has the mesa structure having a diameter of a summit ranging between 100 nm and 500 nm is formed.

Subsequently, although illustration is omitted, μ-photoluminescence spectrum of the produced quantum dot structure is measured, and a quantum dot structure that shows the desired bright lines λ1 through λn is sorted out. In this way, the quantum dot structure of the embodiment is obtained. Here, the thickness, the temperature, etc., described above are given as examples, and are not limited to them.

Second Embodiment

A private key delivery system 60 according to the second embodiment of the present invention is a system wherein private key information is transmitted from a transmitter 61 to n receivers $40_1$ through $40_n$ using a quantum code. The private key delivery system 60 according to the second embodiment is a modification of the private key delivery system 10 of the first embodiment.

FIG. 8 is a block diagram showing the structure of the private key delivery system 60 according to the second embodiment of the present invention. The same reference numbers are given to portions corresponding to the portions described with reference to the first embodiment, and explanations thereof are not repeated.

The private key delivery system 60 shown by FIG. 8 delivers the private key information from the transmitter 61 simultaneously in a quantum code to each of n receivers $40_1$ through $40_n$. The private key delivery system 60 uses a single photon sequence that is multiplexed by n wavelengths, puts the private key information to be sent to each of the receivers $40_1$ through $40_n$ on a single photon sequence having one wavelength, and simultaneously transmits the private key information to the n receivers through n optical transmission lines.

The private key delivery system 60 includes optical transmission lines $11_1$ through $11_n$, the transmitter 61 that puts the private key information on the single photons, and sends the private key information to the optical transmission lines $11_1$ through $11_n$, and the receivers $40_1$ through $40_n$ that take out the private key information from the single photon sequence received from the corresponding optical transmission lines $11_1$ through $11_n$.

The second embodiment differs from the first embodiment in that the transmitter 61 of the second embodiment is does not have the optical multiplexer 25 included in the transmitter 20 of the first embodiment. Since the transmitter 61 has the same wavelength multiplexed single photon generating unit 21 as the first embodiment, the single photon sequence that is multiplexed with n wavelengths can be correctly and efficiently generated.

The receivers $40_1$ through $40_n$ are provided corresponding to the wavelengths $\lambda 1$ through $\lambda n$. The receivers $40_1$ through $40_n$ include detecting units $42_1$ through $42_n$, respectively. The detecting units $42_1$ through $42_n$ have the same structure as the detecting units $42_1$ through $42_n$ of the first embodiment shown by FIG. 1.

Next, operations of the private key delivery system 60 according to the second embodiment are described. The transmitter 61 of the private key delivery system 60 assigns an element of the private key information to the single photons separated into the wavelengths $\lambda 1$ through $\lambda n$, and transmits the single photons as a single photon sequence that includes two or more single photons that bear the private key information. The single photon sequence of a wavelength is transmitted to one corresponding receiver. Thus, the single photon sequences including n wavelengths are simultaneously transmitted to the corresponding receivers $40_1$ through $40_n$.

The private key information is taken out from the single photon sequence by each of the receivers $40_1$ through $40_n$. Thus, the private key information is shared between the transmitter 60 and each of the receivers $40_1$ through $40_n$.

The private key delivery system 60 according to the second embodiment enables one transmitter 61, which includes the wavelength multiplexed single photon generating unit 21, to simultaneously transmit the private key information to n receivers $40_1$ through $40_n$, which has been impossible by the conventional practice. Like the private key delivery system 10 of the first embodiment, the private key delivery system 60 of the second embodiment can transmit the private key information at a high transfer rate, and information security is higher than the conventional private key delivery system using a pseudo-single photon generating unit.

Third Embodiment

According to a private key delivery system 70 of the third embodiment of the present invention, a transmitter 80 separates wavelength multiplexed single photon pairs in an entangled state, and transmits the two photons of the separated pair to two corresponding receivers 91 and 92, and the two receivers 91 and 92 generate private key information based on the quantum state of the single photons that are wavelength multiplexed such that the private key information is shared. Here, the single photon pair in the entangled state refers to a single photon pair in a state where the quantum state (the state that is described by the quantum theory) of two single photons is of a specific combination.

Figure 9:
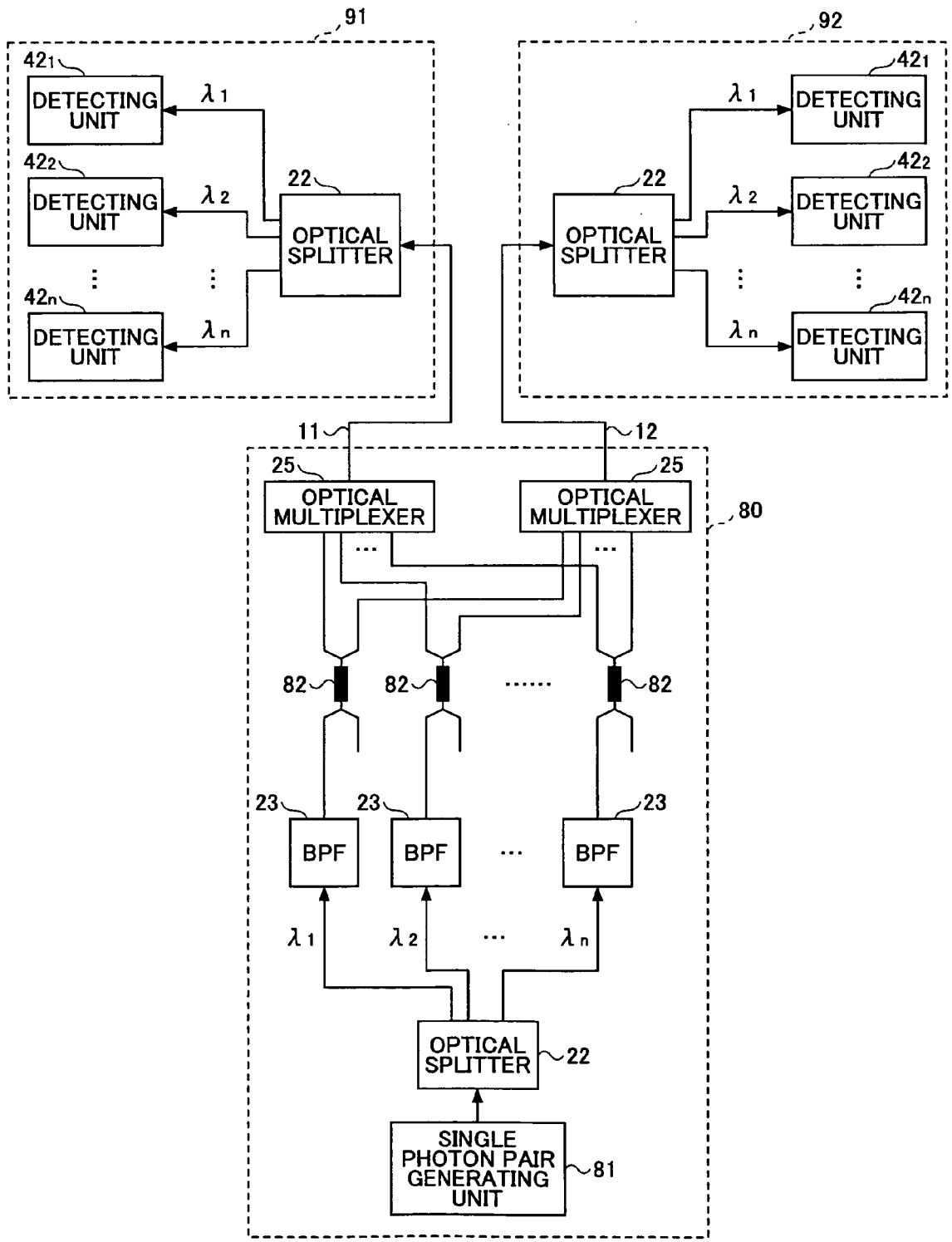
FIG. 9 is a block diagram showing the structure of a private key delivery system according to the third embodiment of the present invention.

FIG. 9 is a block diagram showing the structure of the private key delivery system 70 according to the third embodiment of the present invention.

With reference to FIG. 9, the private key delivery system 70 includes two optical transmission lines 11 and 12, the transmitter 80 that generates wavelength multiplexed single photon pairs in the entangled state, separates the single photon pairs into two groups of individual single photons having different wavelengths, multiplexes the individual single photons of each group, and transmits the multiplexed single photons of the groups to the corresponding optical transmission lines 11 and 12, and the two receivers 91 and 92 that receive the corresponding groups of the single photons that are wavelength multiplexed from the optical transmission lines 11 and 12, respectively.

The transmitter 80 includes a single photon pair generating unit 81 for generating wavelength multiplexed single photon pairs in the entangled state, the optical splitter 22 for separating the wavelength multiplexed single photon pairs by wavelengths, the band pass filters 23 for attenuating unnecessary frequency components of each of the single photon pairs separated by wavelengths, optical couplers 82 for separating a single photon pair into two individual single photons, and the optical multiplexers 25 for multiplexing the individual single photons corresponding to the wavelengths, and sending out the multiplexed single photons to the corresponding optical transmission lines 11 and 12.

The structure of the single photon pair generating unit 81 is the same as the wavelength multiplexed single photon generating unit 21 shown by FIG. 2. That is, the single photon pair generating unit 81 includes the laser light source 28, the optical coupler 29, the output monitor 30, the condensing optical system 31, the quantum dot structure 50, the refrigerator 35, the low pass filter 37, and the optical fibers 36 that connect these items as shown by FIG. 2. According to the third embodiment, single photon pairs in the entangled states having different wavelengths (wavelength multiplexed) are generated by irradiation of an excitation light using the quantum dot structure of the first embodiment. Theoretically, the generation of single photon pairs in the entangled state is expected from the quantum dot structure as described below. The single photon pairs in the entangled states having different wavelengths must be able to be generated according to this theory and the quantum dot structure of the first embodiment.

Figure 10:
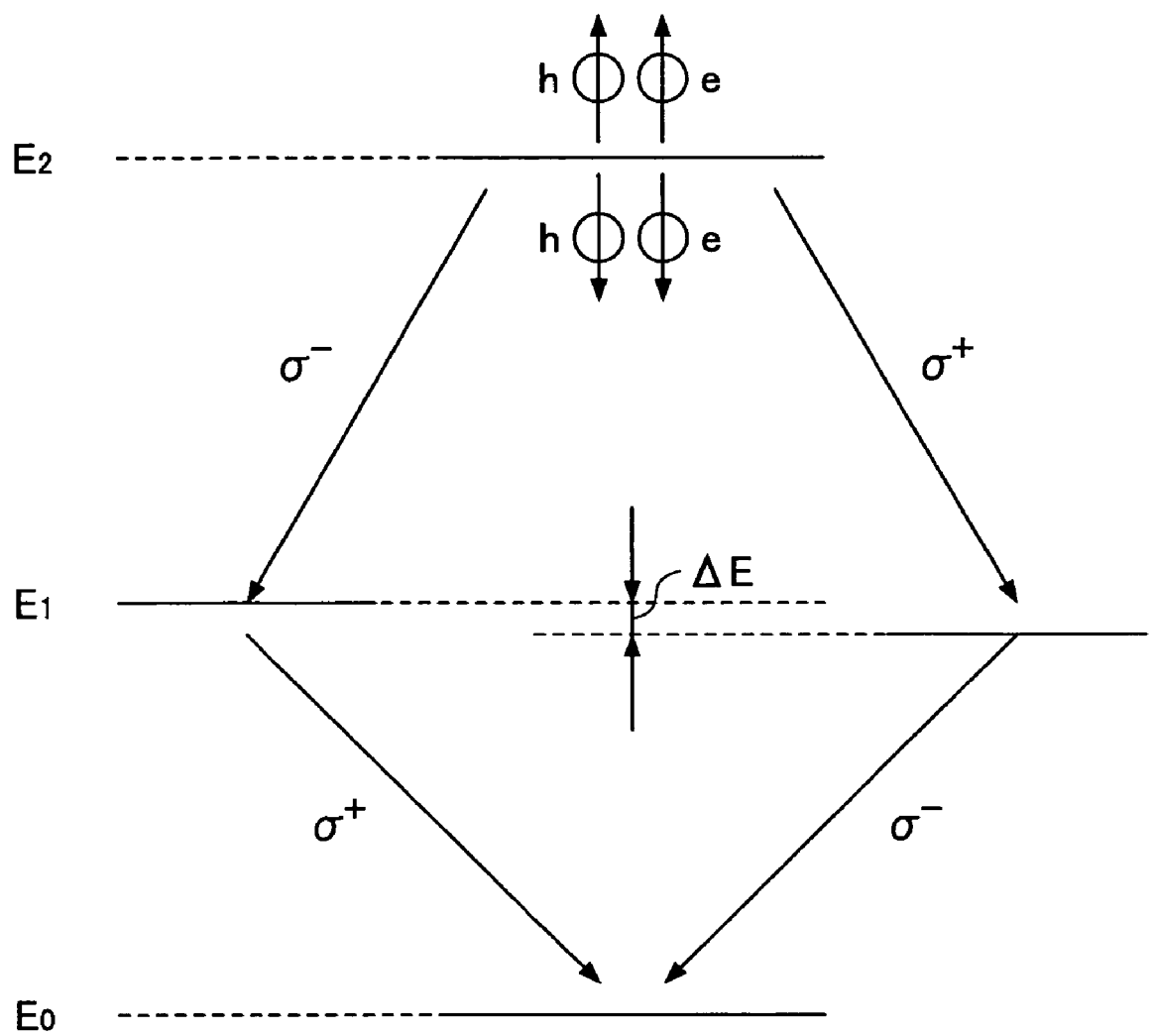
FIG. 10 is an energy-state diagram for explaining generation of a single photon pair in an entangled state.

FIG. 10 is an energy-state diagram for explaining generation of a single photon pair in the entangled state.

With reference to FIG. 10, if an excitation light is irradiated to the quantum dot structure, a 2-exciton state $E_2$ arises in an InAs quantum dot. Two electron/hole pairs having different spin directions transit to the 2-exciton state $E_2$. When the electron/hole pair in the 2-exciton state $E_2$ transits to a ground state $E_0$ through a 1-exciton state $E_1$, it is theoretically known that it transits in two paths (Phys. Rev. Lett. Vol. 84 (2000) pp. 2513-2516). In one of the paths, when it transits to the 1-exciton state $E_1$ from the 2-exciton state $E_2$, a single photon σ+ of the right-handed circularly polarized light is emitted, and subsequently, when it transits to the ground state $E_0$, a single photon σ− of the left-handed circularly polarized light is emitted. Further, in the other path, when transiting to the 1-exciton state $E_1$ from the 2-exciton state $E_2$, a single photon σ− of the left-handed circularly polarized light is emitted, and subsequently, when transiting to the base state $E_0$, a single photon σ+ of the right-handed circularly polarized light is emitted. In this way, there are a single photon pair wherein the single photon σ+ and the single photon σ− are emitted in cascade in this order, and another single photon pair wherein the single photon σ− and the single photon σ+ are emitted in cascade in this order. If a single photon of each of these single photon pairs is the right-handed circularly polarized light, the single photon of the other is the left-handed circularly polarized light. That is, the single photons of a single photon pair have correlation, and are in the entangled state.

With reference to FIG. 9 again, the single photon pair generating unit 81 emits single photon pairs in the entangled state. Further, since the quantum dots, sizes of which differ, are formed in the quantum dot structure, the single photon pair generating unit 81 has the possibility of emitting the single photon pairs simultaneously that are wavelength multiplexed in the entangled states.

The optical splitter 22 and the bandpass filters 23 that are the same as the first embodiment splits the single photon pairs by wavelengths λ1 through λn, and passes only the single photon pairs of the desired wavelengths λ1 through λn, respectively.

The coupler 82 simply separates a single photon pair into a single photon of the right-handed circularly polarized light and a single photon of the left-handed circularly polarized light, the single photons being provided to the corresponding optical multiplexers 25. The optical multiplexers 25 multiplex (i.e., carry out wavelength multiplexing) the single photons sent from the corresponding optical couplers 82, and provide the wavelength multiplexed single photons to the corresponding optical transmission lines 11 and 12. That is, the single photon pairs in the entangled state are separated into single photons, and separately transmitted to the receivers 91 and 92.

Each of the receivers 91 and 92 includes the optical splitter 22 for splitting the wavelength multiplexed single photons received from the corresponding optical transmission lines by wavelengths, and the detecting units $42_1$ through $42_n$ for detecting the right-handed rotation or the left-handed rotation, as applicable, circularly polarized light for every single photon.

The configuration of the optical splitter 22 is the same as the optical splitter 22 of the transmitter 80, and splits the multiplexed single photons to every wavelength λ1 through λn.

Avalanche photodiodes can be used as the detecting units $42_1$ through $42_n$. It is desirable that the same type of the detecting units be used in the receivers 91 and 92.

Next, operations of the private key delivery system 70 according to the third embodiment are described. In the private key delivery system 70, a private key is generated as follows.

The single photons in the entangled state are transmitted from the transmitter 80 to the receivers 91 and 92. For simplicity of description, the wavelength λ1 is taken for example. If a single photon of the right-handed circularly polarized light is detected by the detecting unit $42_1$ corresponding to the wavelength λ1 of the receiver 91, it is decided that a single photon of the left-handed circularly polarized light is surely detected by the detecting unit $42_1$ corresponding to the wavelength λ1 of the receiver 92.

Therefore, if the detecting unit 42 of the receiver 91 detects a direction of the circular polarization of light of a single photon, it is automatically decided that the detecting unit 42 corresponding to the same wavelength of the receiver 92 detects the reverse direction of the circular polarization of light. Information of the detected wavelengths λ1 through λn is decoded, and the private key information is obtained. For example, in the receiver 91, the right-handed circularly polarized light is set to "1", and the left-handed circularly polarized light is set to "0". In the receiver 92, the right-handed circularly polarized light is set to "0", and the left-handed circularly polarized light is set to "1". In this way, the receivers can share the private key. Here, the information of all the wavelengths λ1 through λn may represent the private key information, or alternatively, information of a part of the wavelengths λ1 through λn may represent the private key information. Further, the operations may be serially repeated so that the number of bits of the private key information is increased.

When detecting whether a third person is intercepting, a part of the information on the private key information is transmitted from one receiver, e.g., the receiver 91, to the other receiver, e.g., the receiver 92 through an open channel (not illustrated). The receiver 92, in this example, collates the received information with the information that the receiver 92 already has. The probability of having been intercepted is high if the ratio of information mismatch is high. Third person tapping is detectable in this way. If tapping is detected, the private key information is canceled, and a new private key is delivered.

According to the private key delivery system 70 of the third embodiment, the transmitter 80 simultaneously generates single photon pairs in the entangled states having different wavelengths by the single photon pair generating unit 81, separates each single photon pair into two single photons, carries out wavelength multiplexing of separated single photons, and transmits the wavelength multiplexed photons to two receivers; and the receivers 91 and 92 detect the direction of the circular polarization of light of each single photon of each wavelength, decode and generate the private key information. As described, since wavelength multiplexing of the single photons in the entangled state is carried out, the medium used as the base for generating the private key information can be transmitted at a high transfer rate.

Further, the single photon pair generating unit 81 generates the single photon pairs that are wavelength multiplexed for every shot of the excitation light. This also contributes to the high transfer rate of the private key delivery system 70.

Fourth Embodiment

According to a private key delivery system 100 of the fourth embodiment of the present invention, a transmitter 101 separates wavelength multiplexed single photon pairs in the entangled state into individual single photons, and transmits the corresponding single photons (or single photon sequence) to a first receiver 91 and second receivers $92_1$ through $92_n$, and the first receiver 91 and each of the second receivers $92_1$ through $92_n$ generate private key information based on the quantum state of the corresponding single photons (or single photon sequence) such that the private key information is shared.

The private key delivery system 100 of the fourth embodiment is a modification of the private key delivery system 70 according to the third embodiment.

Figure 11:
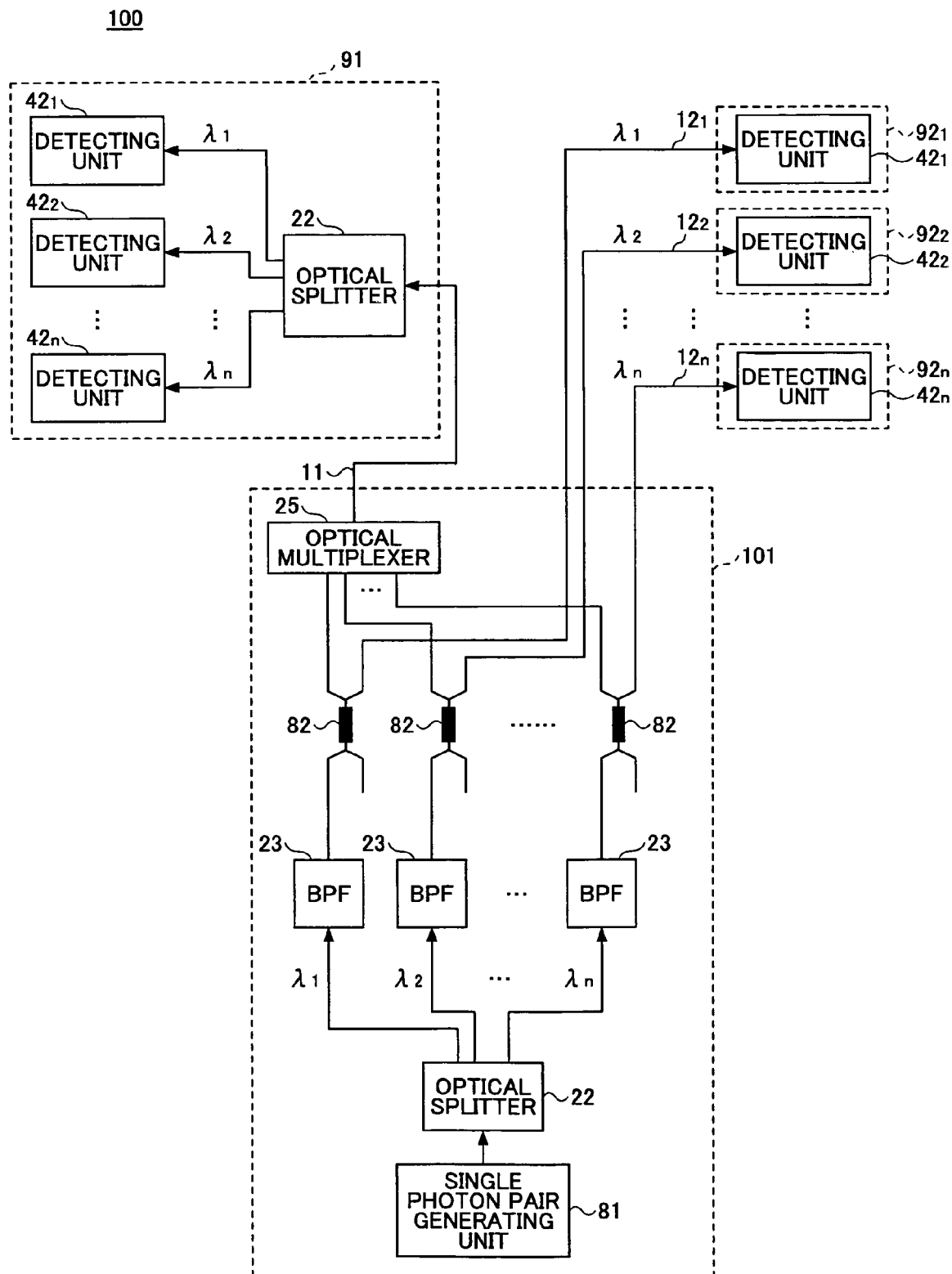
FIG. 11 is a block diagram showing the structure of a private key delivery system according to the fourth embodiment of the present invention.

FIG. 11 is a block diagram showing the structure of the private key delivery system 100 according to the fourth embodiment of the present invention.

With reference to FIG. 11, the private key delivery system 100 includes the transmitter 101, the first receiver 91 to which wavelength multiplexed single photons are provided, the second receivers $92_1$ through $92_n$ to which single photons of corresponding wavelengths are provided, and optical transmission lines 11, $12_1$ through $12_n$ for connecting the transmitter 100 to the corresponding receivers 91, and $92_1$ through $92_n$.

The transmitter 101 is the same as the transmitter 80 shown by FIG. 9, except that one of the optical multiplexers 25 shown by FIG. 9 is not provided on the side to which the second receivers $92_1$ through $92_n$ are connected. In other words, on this side, the single photons, or the single photon sequences as the time progresses, separated by the optical couplers 82, belong to corresponding wavelengths, i.e., are not multiplexed, and are transmitted to the second receivers $92_1$ through $92_n$ for the corresponding wavelengths.

The first receiver 91 is the same as the receiver 91 shown by FIG. 9, including the detecting units $42_1$ through $42_n$ one for every wavelength. The second receivers $92_1$ through $92_n$ include the detecting units $42_1$ through $42_n$, respectively.

The transmitter 101 carries out wavelength multiplexing of one side of the single photons separated from single photon pairs in the entangled state, and transmits to the first receiver 91. This is the same as the third embodiment. On the other side, the transmitter 101 transmits single photons that are separated from the single photon pairs in the entangled state for every wavelength to the corresponding second receivers $92_1$ through $92_n$.

The first receiver 91 and the second receivers $92_1$ through $92_n$ generate private key information as in the third embodiment. For example, the first receiver 91 and the second receivers $92_1$ through $92_n$ generate the private key information of one or more assigned wavelengths from the single photon sequence containing two or more single photons that are received as the time progresses. Here, the first receiver 91 and the second receivers $92_1$ through $92_n$ may adjust the time when the corresponding single photons are detected, if required. In this way, each of the first receiver 91 and the second receivers $92_1$ through $92_n$ share different private key information.

According to the private key delivery system 100 of the fourth embodiment, the single photon pair generating unit 81 of the transmitter 101 simultaneously generates the single photon pairs in the entangled state having different wavelengths, separates the single photon pairs into single photons grouped by wavelength, carries out wavelength multiplexing of the groups of single photons, and transmits the wavelength multiplexed single photons to the first receiver 91. Further, the transmitter 101 transmits a single photon of a different wavelength to each of the second receivers $92_1$ through $92_n$. Then, the first receiver 91 and the second receivers $92_1$ through $92_n$ detect the direction of the circular polarization of the light, decode, and generate private key information from each of the single photons (unit photon sequences) that are received as the time progresses. In this way, the private key delivery system 100 simultaneously delivers each medium for generating the private key information, i.e., the single photons in the entangled state to the first receiver 91 and the second receivers $92_1$ through $92_n$. Conventionally, transmission of the medium for generating the private key information is repeated n times to the first receiver and each of the second receivers. According to the private key delivery system 100 of the present invention, transmission is carried out in parallel, and a high speed transfer rate is obtained.

Further, the single photon pair generating unit 81 generates the single photon pairs that are wavelength multiplexed for every shot of the excitation light. This also contributes to the private key delivery system 100 providing efficient and high speed transfer of the medium for generating the private key information.

Fifth Embodiment

According to a private key delivery system 110 of the fifth embodiment of the present invention, a transmitter 111 separates wavelength multiplexed single photon pairs in the entangled state into two groups of single photons, transmits one of the groups of single photons to n first receivers $91_1$ through $91_n$, and transmits the other group of single photons to n second receivers $92_1$ through $92_n$; and each of the first receivers and the second receivers generates and shares private key information based on the quantum state of the single photon (or a single photon sequence). The private key delivery system 110 according to the fifth embodiment is a modification of the private key delivery system 100 according to the fourth embodiment.

Figure 12:
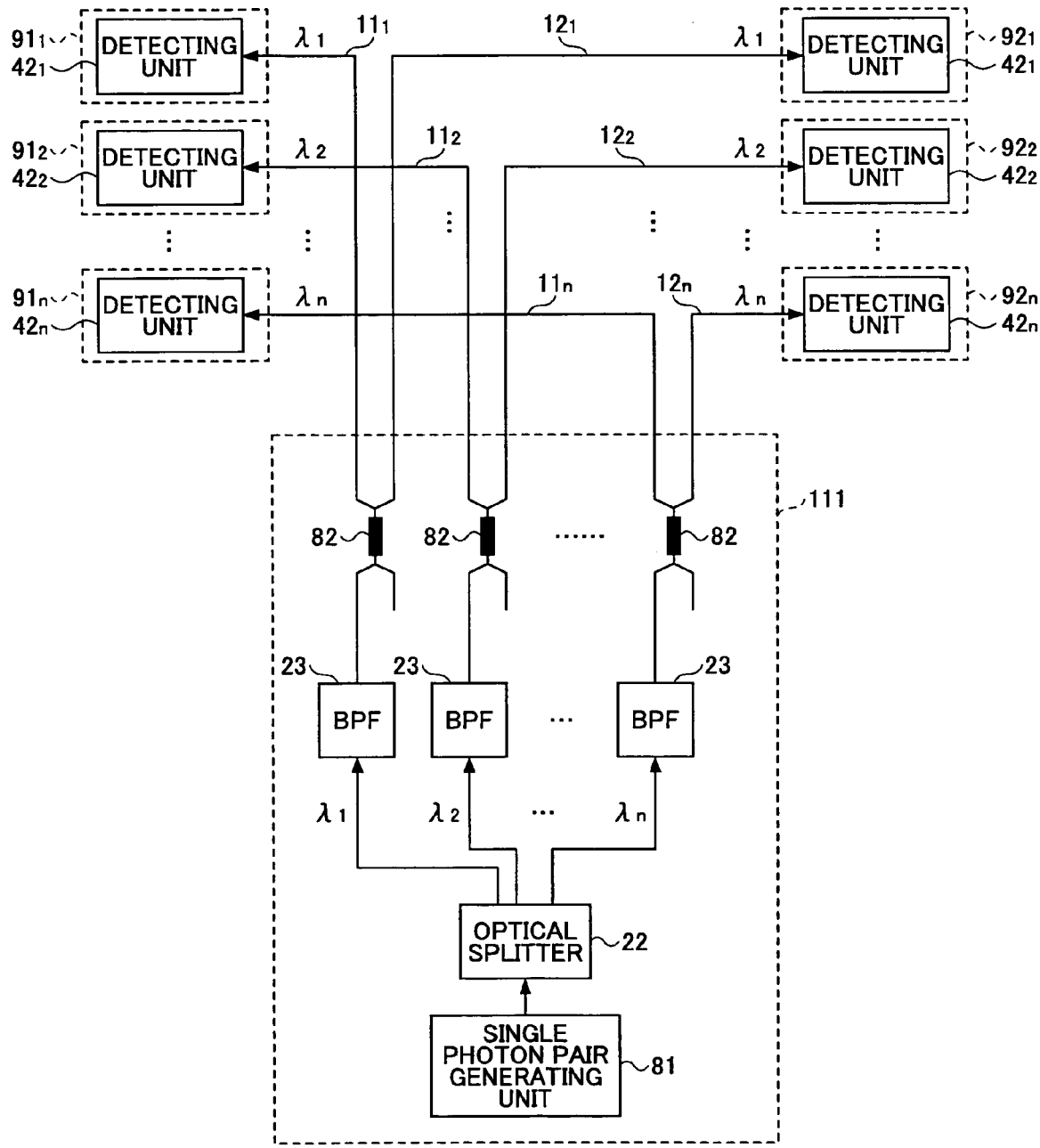
FIG. 12 is a block diagram showing the structure of a private key delivery system according to the fifth embodiment of the present invention.

FIG. 12 is a block diagram showing the structure of the private key delivery system 110 according to the fifth embodiment of the present invention.

With reference to FIG. 12, the private key delivery system 110 includes the transmitter 111, the first receivers $91_1$ through $91_n$ to which a single photon of a corresponding wavelength is supplied, the second receivers $92_1$ through $92_n$ to which a single photon of a corresponding wavelength is supplied, and optical transmission lines $11_1$ through $11_n$, and $12_1$ through $12_n$ for connecting the transmitter 111 and the first receivers $91_1$ through $91_n$ and the second receivers $92_1$ through $92_n$.

The transmitter 111 is the same as the transmitter 101 shown by FIG. 11, except that the optical multiplexer 25 shown by FIG. 11 is dispensed with on the side to which the first receivers $91_1$ through $91_n$ are connected. Namely, the single photons of a wavelength separated by the optical couplers 82 are individually (i.e., not multiplexed) transmitted to the first receivers $91_1$ through $91_n$ for every wavelength.

Each of the first receivers $91_1$ through $91_n$ are the same as the receiver 92 shown by FIG. 11, including the detecting units $42_1$ through $42_n$ for every wavelength. The first receivers $91_1$ through $91_n$ include the same detecting units $42_1$ through $42_n$, respectively, as shown by FIG. 11.

The transmitter 111 transmits one of the single photons separated from a single photon pair of a wavelength in the entangled state to the first receivers $91_1$ through $91_n$ each for every wavelength. Further, the transmitter 111 transmits the other of the separated single photon pair in the entangled state to the second receivers $92_1$ through $92_n$ each for every wavelength.

The first receivers $91_1$ through $91_n$ and the second receivers $92_1$ through $92_n$ generate private key information as in the third embodiment. For example, the first receivers $91_1$ through $91_n$ and the second receivers $92_1$ through $92_n$ generate the private key information of the assigned wavelength from the single photon sequence that includes two or more single photons received as the time progresses. Here, the first receivers $91_1$ through $91_n$ and the second receivers $92_1$ through $92_n$ may adjust the time when the corresponding single photons are detected, if required. In this way, one of the first receivers and the corresponding second receiver that detect the single photons of the same wavelength share the private key information. That is, the first receiver $91_1$ and the corresponding second receiver $92_1$ that receive the single photons of wavelength $\lambda 1$ share the private key information. Accordingly, n sets of the first receivers and the second receivers share the private key information. Here, it is probable that the private key information that each group has mutually differs.

The single photon pair generating unit 81 of the transmitter 111 of the private key delivery system 110 according to the fifth embodiment simultaneously generates single photon pairs in the entangled states having different wavelengths, separates the single photon pairs of each wavelength into two groups of single photons, transmits one of the groups of single photons to the corresponding first receivers $91_1$ through $91_n$ for every wavelength, and transmits the other group of single photons to the corresponding second receivers $92_1$ through $92_n$ for every wavelength. The first receivers $91_1$ through $91_n$ and the second receivers $92_1$ through $92_n$ detect the direction of the circular polarization of the light, decode, and generate private key information from each the single photons (unit photon sequences) received as the time progresses. In this way, the private key delivery system 110 can simultaneously deliver each medium, i.e., the entangled single photons for generating the private key information to the n sets of the first receivers and the second receivers. Conventionally, transmission of the medium for generating private key information has to be repeated n times between each of the first receivers and the second receivers. According to the present invention, since transmission is carried out in parallel, the private key delivery system 110 can be performed at high speed.

Further, the single photon pair generating unit 81 generates the single photon pairs that are wavelength multiplexed for every shot of the excitation light. This contributes to the fact that the private key delivery system 110 is efficient, and can transmit the medium for generating the private key information at a high transfer rate.

Further, the present invention is not limited to these embodiments, but variations and modifications may be made without departing from the scope of the present invention.

The present application is based on Japanese Priority Application No. 2005-040977 filed on Feb. 17, 2005 with the Japanese Patent Office, the entire contents of that are hereby incorporated by reference.

What is claimed is:

1. A private key delivery system, comprising:
   a transmitter that includes a single photon generating unit for generating single photons, and an encoding unit for encoding the single photons with private key information;
   a receiver that includes a detecting unit for detecting the private key information from the single photons; and
   an optical transmission line for connecting the transmitter and the receiver; wherein
   the single photon generating unit of the transmitter includes a quantum dot structure for simultaneously generating a plurality of the single photons having different wavelengths,
   the transmitter further comprises an optical splitter for splitting the single photons by wavelengths, the optical splitter being inserted between the single photon generating unit and the encoding unit, and
   the encoding unit is provided corresponding to each of the wavelengths of the single photons.

2. The private key delivery system as claimed in claim 1, wherein
   the transmitter further comprises an optical multiplexer for multiplexing the single photons having different wavelengths, and for simultaneously sending out the multiplexed single photons to the optical transmission line, the optical multiplexer being provided between the encoding unit and the optical transmission line, and
   the receiver further comprises another optical splitter for splitting each of the single photons by wavelengths, the other optical splitter being provided between the optical transmission line and the detecting unit, the detecting unit being provided corresponding to each of the wavelengths of the single photons.

3. The private key delivery system as claimed in claim 1, wherein the transmitter sends out the single photons having different wavelengths to a plurality of the optical transmission lines for every wavelength for transmitting the private key information to a plurality of the receivers.

4. The private key delivery system as claimed in claim 1, wherein the single photon generating unit includes a laser light source, and the quantum dot structure emits single photons by irradiation of a light from the laser light source.

5. The private key delivery system as claimed in claim 1, wherein the quantum dot structure includes a plurality of quantum dots having mutually different sizes on a semiconductor.

6. The private key delivery system as claimed in claim 1, further comprising:
   a bandpass filter for intercepting photons having other wavelengths than a predetermined wavelength, the bandpass filter being provided between the optical splitter and the encoding unit.

7. A private key delivery system, comprising:
a transmitter that includes
   a single photon generating unit that includes a quantum dot structure for simultaneously generating a plurality of single photons having different wavelengths,
   an optical splitter for splitting the single photons by wavelengths,
   an encoding unit for encoding each of the single photons with corresponding elements of the private key information, and an optical multiplexer for multiplexing the single photons having different wavelengths provided by the encoding unit, and for simultaneously sending out the multiplexed single photons to the optical transmission line;

a receiver that includes another splitter for splitting the single photons by wavelengths, and a detecting unit that is provided corresponding to each wavelength of the single photons for detecting the element of the private key information from each of the single photons; and the optical transmission line for connecting the transmitter and the receiver.

8. A private key delivery system, comprising:

a transmitter that includes a single photon generating unit that further includes a quantum dot structure for simultaneously generating a plurality of single photons having different wavelengths, an optical splitter for splitting the single photons by wavelengths, and an encoding unit for encoding the single photons with corresponding elements of the private key information;

a plurality of receivers, the quantity of which is equal to the quantity of the wavelengths, each receiver including a detecting unit for detecting a corresponding element of the private key information from a corresponding single photon; and optical transmission lines for connecting the transmitter and each of the receivers.

9. A private key delivery method for a transmitter and a receiver sharing private key information, comprising:

the transmitter simultaneously generating a plurality of single photons having different wavelengths by excitation light irradiated to a quantum dot structure;

the transmitter encoding each of the single photons with an element of the private key information;

the transmitter transmitting the encoded single photons to the receiver; and the receiver taking out the private key information from each of the single photons.

10. The private key delivery method as claimed in claim 9, wherein the transmitter multiplexes the encoded single photons having different wavelengths, and transmits the multiplexed single photons to the receiver.

11. The private key delivery method as claimed in claim 9, wherein a plurality of receivers is provided, the transmitter forms single photon sequences of encoded single photons of each of the wavelengths, and the transmitter transmits the single photon sequences to the corresponding receivers.

* * * * *